(12) United States Patent
Lee

(10) Patent No.: US 11,285,618 B2
(45) Date of Patent: Mar. 29, 2022

(54) GRIP APPARATUS AND ROBOT HAVING THE SAME

(71) Applicant: LG ELECTRONICS INC., Seoul (KR)

(72) Inventor: Donghyeong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

(21) Appl. No.: 16/570,094

(22) Filed: Sep. 13, 2019

(65) Prior Publication Data

US 2020/0001473 A1 Jan. 2, 2020

(30) Foreign Application Priority Data

Aug. 19, 2019 (KR) .......................... 10-2019-0101159

(51) Int. Cl.
*B25J 15/00* (2006.01)
*B25J 9/16* (2006.01)
*B25J 19/02* (2006.01)

(52) U.S. Cl.
CPC ......... *B25J 15/0023* (2013.01); *B25J 9/1612* (2013.01); *B25J 9/1694* (2013.01); *B25J 15/0038* (2013.01); *B25J 19/02* (2013.01)

(58) Field of Classification Search
CPC .... B25J 15/0023; B25J 15/0038; B25J 15/02; B25J 15/0028; B25J 9/1694; B25J 9/1612; B25J 9/02; B25J 13/085
See application file for complete search history.

(56) References Cited

U.S. PATENT DOCUMENTS

| | | | | |
|---|---|---|---|---|
| 2,763,507 A | * | 9/1956 | Haley | ...................... D01D 7/02 294/93 |
| 3,347,545 A | * | 10/1967 | Nichols | .................. A63H 37/00 472/51 |
| 6,082,796 A | * | 7/2000 | Scaglia | ................ B65H 67/065 242/573.9 |
| 6,843,153 B1 | * | 1/2005 | Rawson-Harris | ... F16B 23/0007 81/120 |
| 10,357,883 B1 | * | 7/2019 | O'Connor | ............ B25J 15/0683 |
| 2013/0106127 A1 | * | 5/2013 | Lipson | ..................... B25J 15/12 294/189 |
| 2017/0072572 A1 | * | 3/2017 | Wagner | .................... B25J 18/00 |

* cited by examiner

*Primary Examiner* — Stephen A Vu
(74) *Attorney, Agent, or Firm* — Birch, Stewart, Kolasch & Birch, LLP

(57) ABSTRACT

A grip apparatus is provided. The grip apparatus includes: a housing formed therein with an accommodation space opened downward to accommodate an object; an elastic membrane provided in the accommodation space and surrounding the object; a fastening member at least partially positioned between an inner periphery of the housing and the elastic membrane to fasten the elastic membrane; and a winder configured to pull the fastening member by winding the fastening member.

17 Claims, 12 Drawing Sheets

GRIP APPARATUS AND ROBOT HAVING THE SAME

CROSS-REFERENCE TO RELATED APPLICATIONS

The present application claims priority under 35 U.S.C. 119 and 35 U.S.C. 365 to Korean Patent Application No. 10-2019-0101159 (Aug. 19, 2019), which is hereby incorporated by reference in its entirety.

BACKGROUND

The present disclosure relates to a grip apparatus and a robot having the same to grip an object quickly and accurately.

Robots are generally used to perform various tasks such as welding, assembly or painting at industrial manufacturing sites. In addition, the robots have been gradually expanding an application area all over industries and service fields including a personal service area to provide general services around human life, and a specialized service area to provide specialized services such as medical services.

In particular, a picking robot for picking up an object has been actively developed. The picking robot requires a gripper capable of quickly and accurately picking atypical objects, that is, objects having various shapes, sizes, and materials.

The gripper is classified into a mechanical gripper having a plurality of fingers driven by hydraulic or pneumatic pressure to pick up an object mechanically, and a vacuum gripper capable of picking up the object by generating a vacuum on an interface with the object. In addition, an electro-adhesive gripper is also known in which the object adheres thereto using an electrostatic force generated when a current flows through a conductor.

However, the conventional mechanical gripper and vacuum gripper are inefficient to be used for picking up atypical objects due to imitations in picking up the objects, which have various sizes and shapes, at proper pressure without damage. In addition, the conventional electro-adhesive gripper requires a large contact area to pick up heavy objects and has to be applied with a large voltage, so there is a limitation in picking up atypical objects.

SUMMARY

Embodiments provide a grip apparatus and a robot having the same to quickly and accurately grip objects having various sizes and shapes without damage.

The gripper according to the embodiments includes: a housing formed therein with an accommodation space opened downward to accommodate an object; an elastic membrane provided in the accommodation space and surrounding the object; a fastening member at least partially positioned between an inner periphery of the housing and the elastic membrane to fasten the elastic membrane; and a winder configured to pull the fastening member by winding the fastening member.

The fastening member may be a belt or a wire.

The winder may include: a roller rotated about a vertical axis and wound by the fastening member; and a motor configured to rotate the roller.

The gripper according to the embodiments may further include a torque sensor configured to sense a torque load of the motor. The motor may be stopped when a sensed value of the torque sensor reaches a predetermined set torque.

The elastic membrane may include: an upper fixing portion fixed to the housing; a lower fixing portion fixed to the housing and spaced downward from the upper fixing portion; and an elastic portion positioned between the upper fixing portion and the lower fixing portion. The fastening member may face the elastic portion with respect to a horizontal direction.

The housing may be formed therein with a through-hole through which the fastening member passes, in which the through-hole is connected to a space between the inner periphery of the housing and the elastic membrane.

The through-hole may include a pair of through-holes spaced apart from each other in a horizontal direction, and a distance between the pair of through-holes may be shorter than a diameter of the accommodation space.

A plurality of protrusions may be formed on an inner surface of the elastic membrane.

The robot according to the embodiments includes: a manipulator; a housing provided in the manipulator and formed therein with an accommodation space opened downward to accommodate an object; an elastic membrane provided in the accommodation space and surrounding the object; a fastening member at least partially positioned between an inner periphery of the housing and the elastic membrane to fasten the elastic membrane; and a winder configured to pull the fastening member by winding the fastening member.

The fastening member may be a belt or a wire.

The robot according to the embodiments may further include a controller configured to control the manipulator so that the housing descends while the accommodation space is positioned above the object, and control the winder so that the fastening member is wound while the object is accommodated in the accommodation space.

The winder may include: a roller rotated about a vertical axis and wound by the fastening member; and a motor configured to rotate the roller.

The robot according to the embodiments may further include a torque sensor configured to sense a torque load of the motor. The controller may stop the motor when a sensed value of the torque sensor reaches a predetermined set torque.

The elastic membrane may include: an upper fixing portion fixed to the housing; a lower fixing portion fixed to the housing and spaced downward from the upper fixing portion; and an elastic portion positioned between the upper fixing portion and the lower fixing portion. The fastening member may face the elastic portion with respect to a horizontal direction.

The housing may be formed therein with a through-hole through which the fastening member passes, in which the through-hole is connected to a space between the inner periphery of the housing and the elastic membrane.

The through-hole may include a pair of through-holes spaced apart from each other in a horizontal direction, and a distance between the pair of through-holes may be shorter than a diameter of the accommodation space.

A plurality of protrusions may be formed on an inner surface of the elastic membrane.

The robot according to the embodiments includes: a manipulator; a housing provided in the manipulator and formed therein with an accommodation space opened downward to accommodate an object; an airbag provided at an inner periphery of the housing and surrounding the object; and a pneumatic unit configured to inject air into the airbag.

The robot according to the embodiments may further include a controller configured to control the manipulator so that the housing descends while the accommodation space is positioned above the object, and control the pneumatic so that the airbag inflates while the object is accommodated in the accommodation space.

The pneumatic unit may include: an air pump; and an air channel configured to connect the air pump to the airbag.

The details of one or more embodiments are set forth in the accompanying drawings and the description below. Other features will be apparent from the description and drawings, and from the claims.

DETAILED DESCRIPTION OF THE EMBODIMENTS

Figure 1:
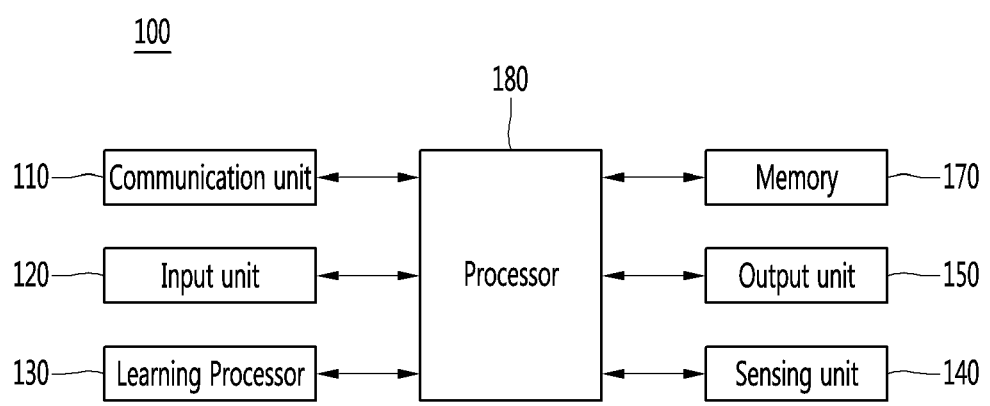
FIG. 1 illustrates an AI device 100 including a robot according to an embodiment of the present invention.

Hereinafter, specific embodiments will be described in detail with reference to the accompanying drawings.
<Robot>
A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.
<Artificial Intelligence (AI)>
Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
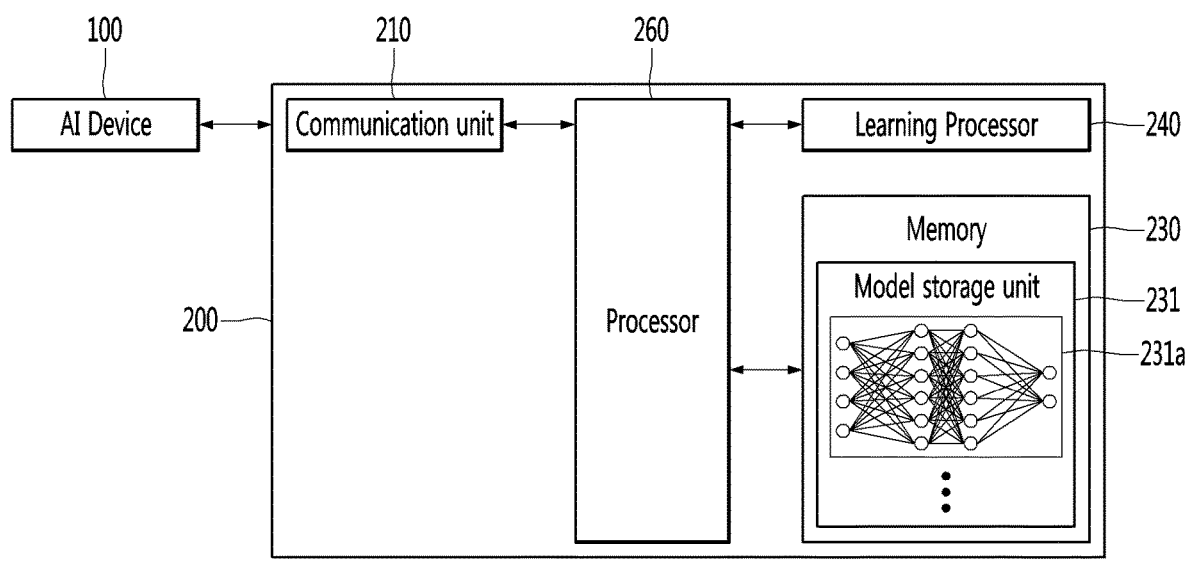
FIG. 2 illustrates an AI server 200 connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
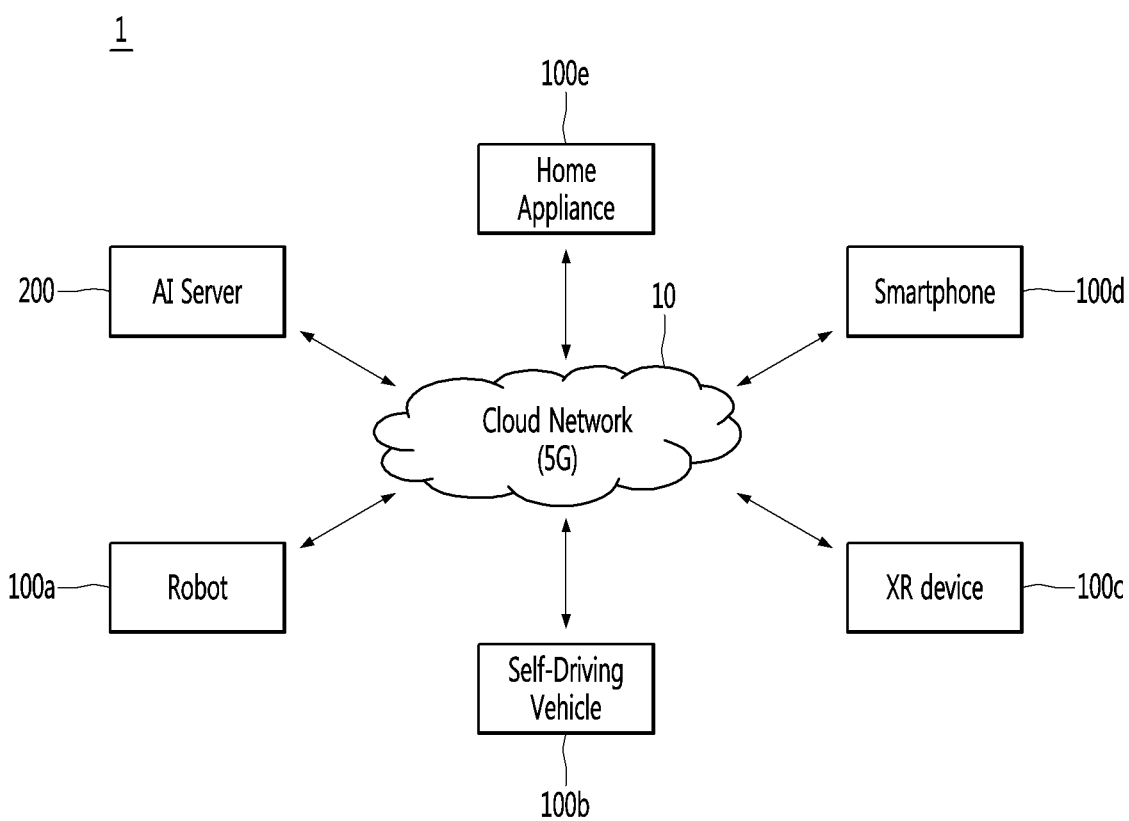
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4A:
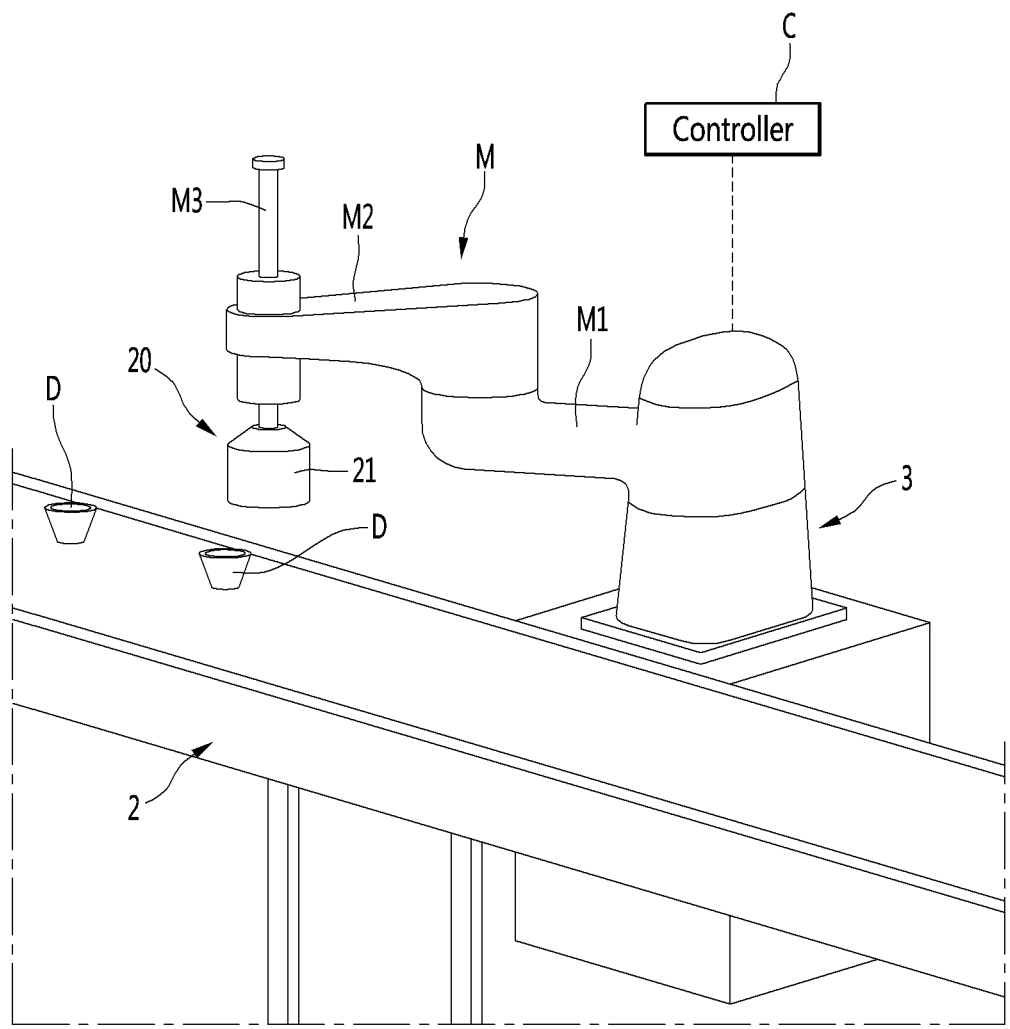
FIGS. 4a and 4b are views illustrating a general configuration and operation of the robot according to the embodiments.
Figure 4B:
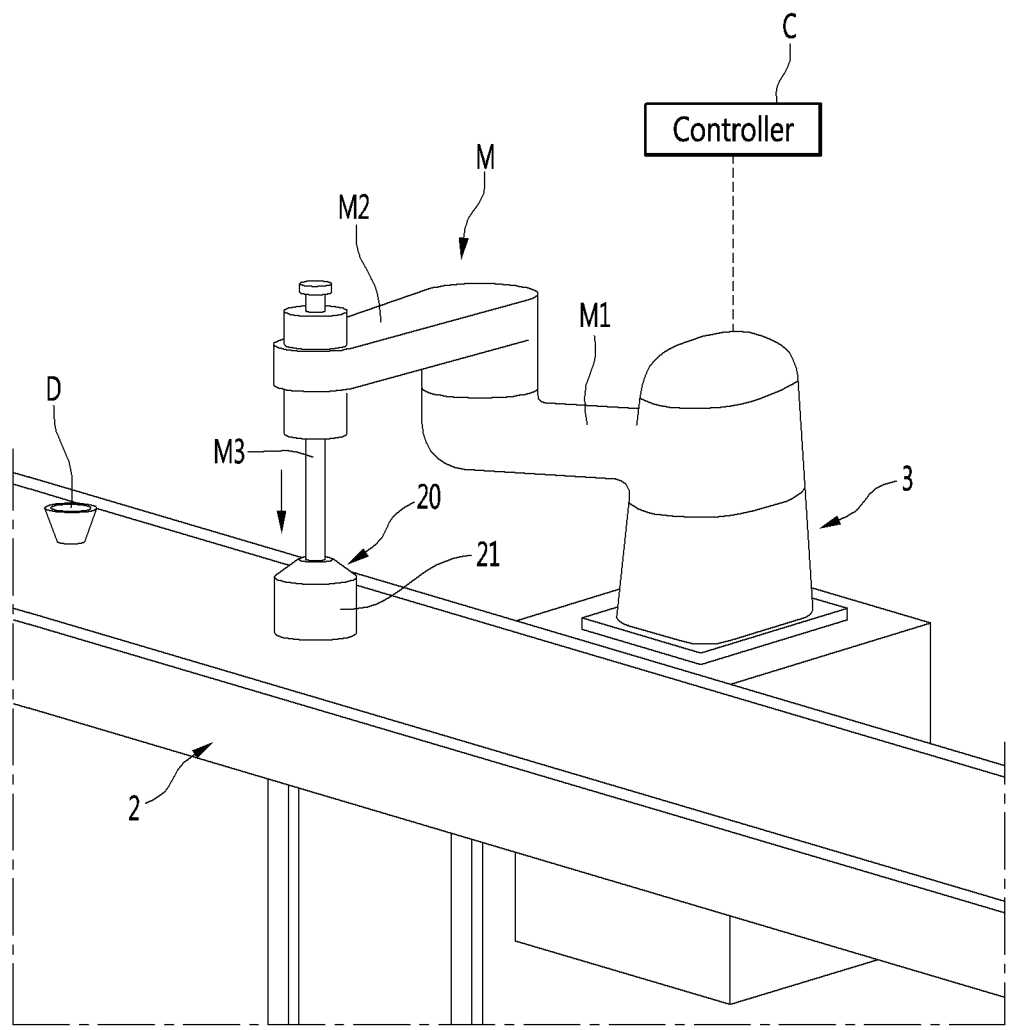

FIGS. 4a and 4b are views illustrating general configurations and operations of the robot according to the embodiments.

The robot according to the embodiments may denote the robot 100a described above. In addition, the robot according to the embodiments may be a scara robot.

The robot according to the embodiments may include a base 3, a manipulator M, a gripper 20, and a controller C.

The base 3 may be mounted on a floor or a structure to entirely support the robot.

The manipulator M may be connected to the base 3, and perform a task within a predetermined radial range around the base 3.

The manipulator M may include a plurality of arms and a plurality of actuators configured to actuate the arms. The configurations and types of the manipulator M are not limited.

For example, the manipulator M may include a first arm M1 connected to the base 3 and rotated about a vertical axis, a second arm M2 connected to an end of the first arm M1 and rotated about the vertical axis, and an elevating member M3 provided at an end of the second arm M2 and moving up and down.

A gripper 20 may be provided at a lower end of the manipulator M, more specifically the elevating member M3. Accordingly, the manipulator M may enable the gripper 20 to move up and down or move in the horizontal direction.

The gripper 20 may grip an object D. More specifically, the gripper 20 may descend from above the object D toward the object D to grip the object.

As shown in FIG. 4a, the object D may be conveyed on a conveyor belt 2 at a constant speed. As shown in FIG. 4b, when the object D reaches a predetermined position on the conveyor belt 2, the manipulator M may grip the object D by controlling the gripper 20. Then, the manipulator M may move the gripper 20 gripping the object D to a predetermined target point. When the gripper 20 reaches the target position, the gripper 20 may release the object D.

An appearance of the gripper 20 may be formed by an outer housing 21, and the outer housing 21 may accommodate a housing 30, an elastic membrane 40, a fastening member 50, and a winder 60 described later.

Figure 5:
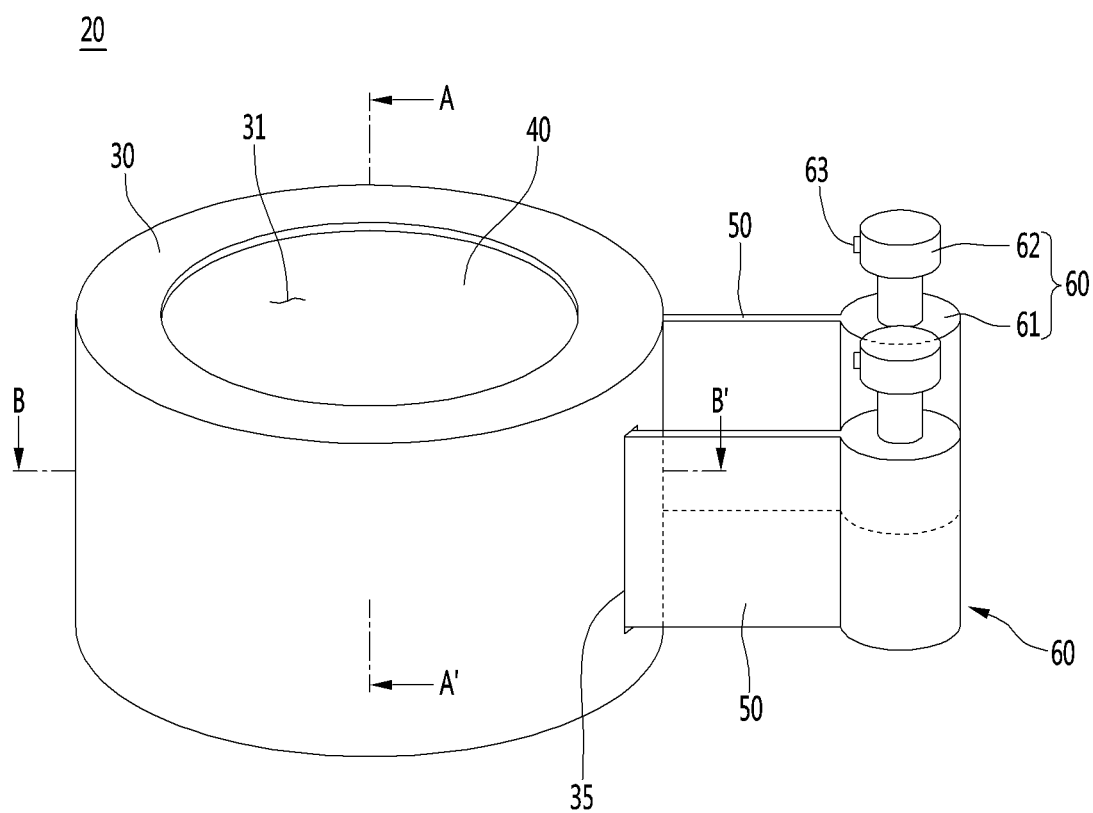
FIG. 5 is a view showing a gripper according to one embodiment.
Figure 6A:
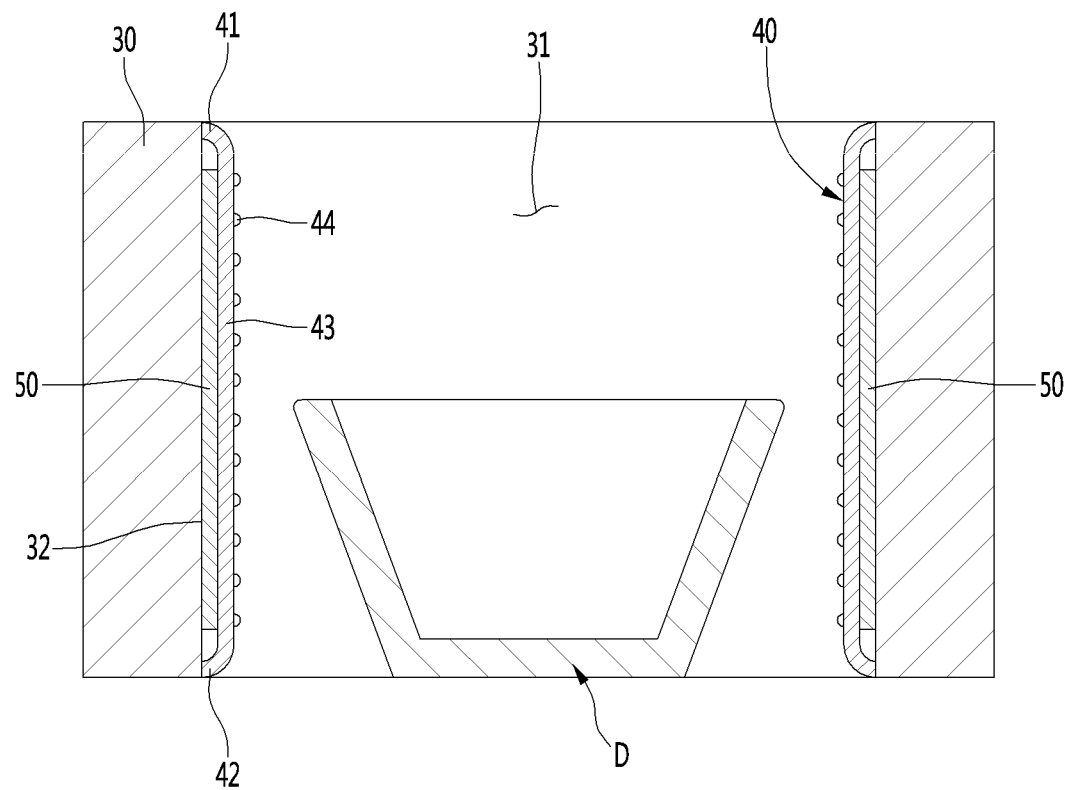
FIGS. 6a and 6b are sectional views taken along line A-A' of the gripper shown in FIG. 5.
Figure 6B:
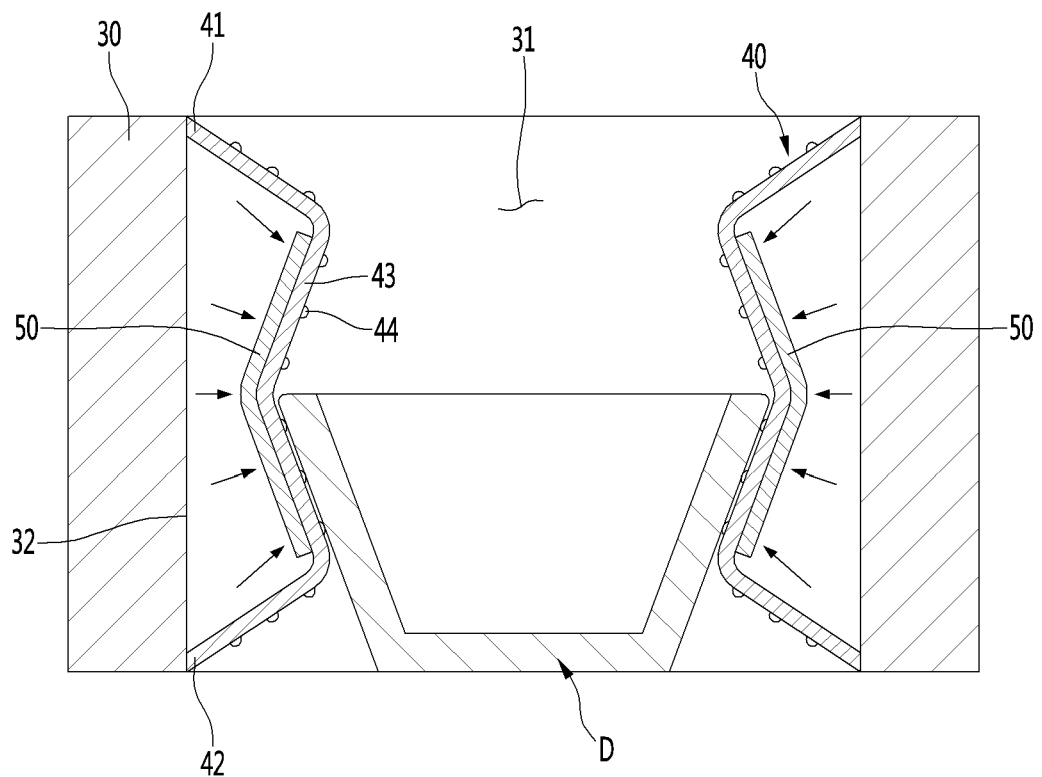
Figure 7A:
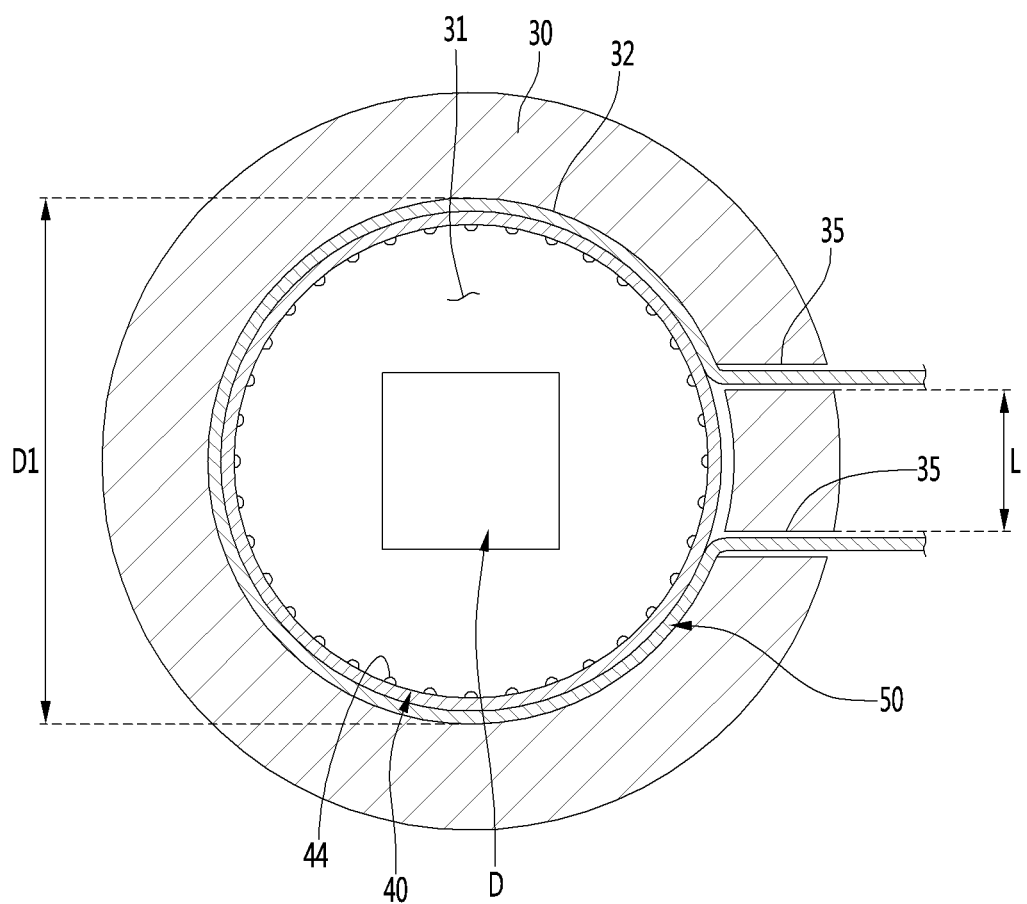
FIGS. 7a and 7b are sectional views taken along line B-B' of the gripper shown in FIG. 5.
Figure 7B:
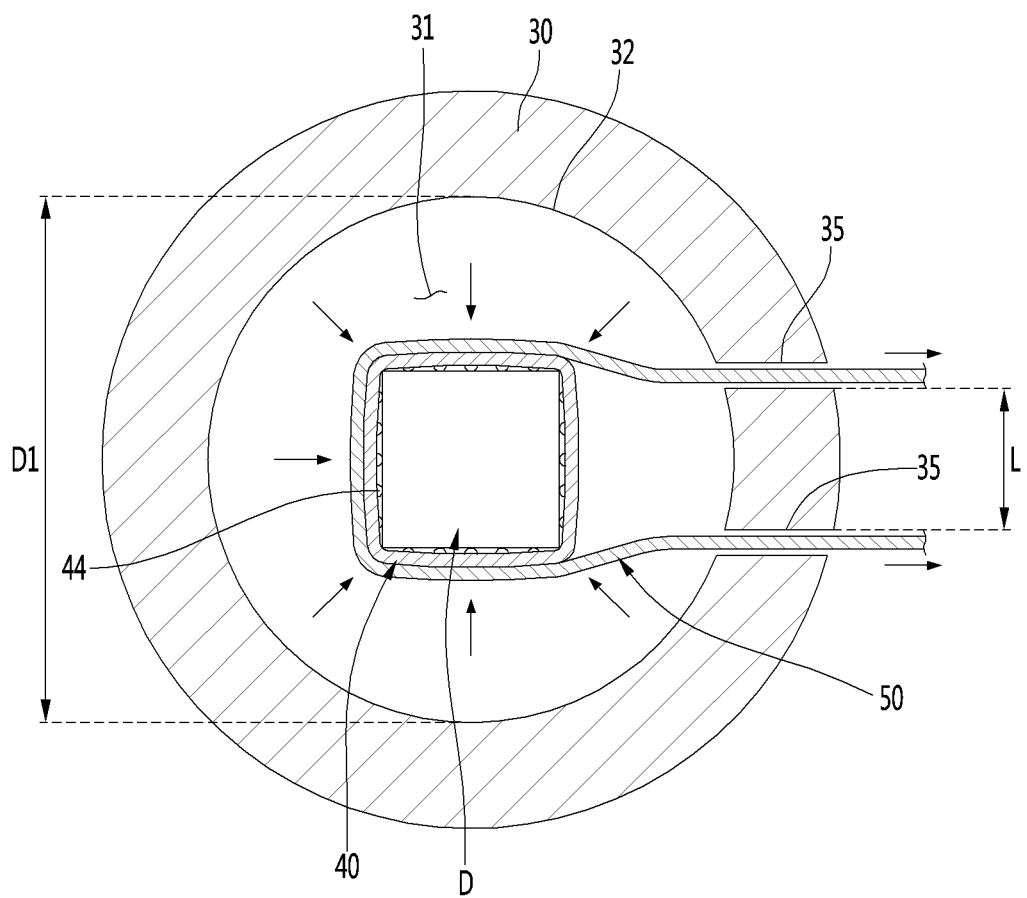

FIG. 5 is a view showing the gripper according to one embodiment. FIGS. 6a and 6b are sectional views taken along line A-A' of the gripper shown in FIG. 5. FIGS. 7a and 7b are sectional views taken along line B-B' of the gripper shown in FIG. 5.

The gripper 20 according to the embodiments may include a housing 30, an elastic membrane 40, a fastening member 50, and a winder 60.

The housing 30 may have a circular hollow cylinder shape. More specifically, the housing 30 may be formed with an accommodation space 31 for accommodating the object D, and the accommodation space 31 may have a hollow shape. In other words, the accommodation space 31 may be defined by an inner circumference 32 of the housing 30, and may be opened upward and downward. However, the embodiments are not limited thereto, and the accommodating space 31 may have a shape opened upward only and closed upward.

The object D may be accommodated in the accommodation space 31. More specifically, the manipulator M (see FIGS. 4a and 4b) may move the gripper 20 downward from above the object D, so that the object D may be accommodated in the accommodation space 31.

The accommodation space 31 may be formed to have a diameter and a height sufficient to accommodate the object D to be gripped. For example, the object D to be gripped may be any one of a plurality of types having various sizes and shapes, and the accommodation space 31 may be formed to have a diameter and a height that can accommodate the object D having the largest size among the types.

The diameter of the accommodation space 31 may denote an inner diameter of the housing 30.

The housing 30 may have a through-hole 35 through which the fastening member 50 described later passes. The through-hole 35 may be a long hole elongated vertically.

The through-hole 35 may be provided with a pair spaced apart in the horizontal direction. The pair of through-holes 35 may be parallel to each other, but are not limited thereto.

The through-hole 35 may be formed through from an outer circumference of the housing 30 to the inner circumference 32. In other words, the through-hole 35 may communicate with the accommodation space 31.

The elastic membrane 40 may be provided in the accommodation space 31 and surround the object D. The elastic membrane 40 may be provided on the inner circumference 32 of the housing 30. The elastic membrane 40 may cover the inner circumference 32 of the housing 30. An outer surface of the elastic membrane 40 may face the inner circumference 32 of the housing 31, and an inner surface of the elastic membrane 40 may face the object D or an upper side portion of the object D.

A horizontal section of the elastic membrane 40 may have a ring shape. The elastic membrane 40 may have a predetermined height.

The elastic membrane 40 may include a material having elasticity. The elastic membrane 40 may be elastically deformed in all directions.

The elastic membrane 40 may be fastened by the fastening member 50 described later to wrap the object D, and thus the object D can be gripped. On the contrary, when the fastening member 50 loosens a force for fastening the elastic membrane 40, the elastic membrane 40 may be restored into the original shape by a restoring force, and thus the object D may be released.

More specifically, the elastic membrane 40 may include an upper fixing portion 41, a lower fixing portion 42, and an elastic portion 43.

The upper fixing portion 41 and the lower fixing portion 42 may be fixed to the housing 30. More specifically, the upper fixing portion 41 may be fixed to an upper portion of the inner circumference 32 of the housing 30 and/or a top surface of the housing 30. The lower fixing portion 42 may be fixed to a lower portion of the inner circumference 32 of the housing 30 and/or a bottom surface of the housing 30.

In particular, the lower fixing portion 42 may be fixed to a lower end of the inner circumference 32 of the housing 30 and/or the bottom surface of the housing 30. Accordingly, the elastic membrane 40 can easily grip the object D even when the height of the object D is low.

The upper fixing portion 41 and the lower fixing portion 42 may be elongated in the circumferential direction.

The upper fixing portion 41 may be positioned above the lower fixing portion 42. The upper fixing portion 41 and the lower fixing portion 42 may be spaced vertically from each other.

The upper fixing portion 41 may include an upper end of the elastic membrane 40 or be adjacent to the upper end of the elastic membrane 40. The lower fixing portion 42 may include a lower end of the elastic membrane 40 or be adjacent to the lower end of the elastic membrane 40.

The elastic portion 43 may be positioned between the upper fixing portion 41 and the lower fixing portion 42. The elastic portion 43 may be positioned inside the fastening member 50, and may be stretched by fastening of the fastening member 50 so as to wrap and grip the object D.

A plurality of protrusions 44 may be formed on the inner surface of the elastic membrane 40. More specifically, the protrusions 44 may be formed on an inner surface of the elastic portion 43. The protrusions 44 may include the same elastic material as the elastic membrane 40, and may be elastically deformed when pressed by the object D.

The protrusions 44 may assist the grip of the object D by the elastic membrane 40. In other words, the protrusions 44 may enable the object D to be gripped more reliably.

The fastening member 50 may fasten the elastic membrane 40. The fastening member 50 may be a belt or a wire. The fastening member 50 may be a single member or include a plurality of members disposed vertically.

At least a part of the fastening member 50 may be positioned between the inner circumference 32 of the housing 30 and the elastic membrane 40. More specifically, at least a part of the fastening member 50 may be positioned between the inner circumference 32 of the housing 30 and an outer surface of the elastic portion 43 in the horizontal direction, and positioned between the upper fixing portion 41 and the lower fixing portion in the vertical direction. The fastening member 50 may be maintained in contact with the inner circumference 32 of the housing 30 at a normal state.

When the fastening member 50 is wound by the winder 60 described later, the fastening member 50 may be spaced apart from the inner circumference 32 of the housing 30, and press and fasten the elastic membrane 40 inward.

The fastening member 50 may pass through the through-hole 35 formed in the housing 30, and enter between the inner circumference 32 of the housing 30 and the elastic membrane 40. In other words, the through-hole 35 may be connected to a space between the inner circumference 32 of the housing 30 and the elastic membrane 40.

More specifically, the fastening member 50 may pass through one of the pair of through-holes 35 from the outside of the housing 30, enter between the inner circumference 32 of the housing 30 and the elastic membrane 40, pass through the other through-hole 35 while wrapping more than a half of an outer circumference of the elastic membrane 40, and come out of the housing 30. In other words, both ends of the fastening member 50 may be positioned outside the housing 30.

A distance L between the pair of through-holes 35 may be shorter than a diameter Dl of the accommodation space 31. Preferably, the distance L between the pair of through-holes 35 may be less than a half of the diameter Dl of the accommodation space 31. Accordingly, the fastening member 50 passing through the pair of through-holes 35 may sufficiently surround the outer circumference of the elastic membrane 40.

The winder 60 may pull the fastening member 50 by winding the fastening member 50. The winder 60 may wind or loosen the fastening member 50. The winder 60 may be positioned outside the housing 30.

More specifically, the winder 60 may include a roller on which the fastening member 50 is wound, and a motor 62 configured to rotate the roller 61

The roller 61 may be elongated vertically. The roller 61 may be rotated about the vertical axis. When the roller 61 is rotated in one direction, the fastening member 50 may be wound on the roller 61, and when the roller 61 is rotated in the other direction, the fastening member 50 may be released from the roller 61.

The roller 61 may include a pair of rollers, and both ends of the fastening member 50 may be connected to the pair of rollers 61, respectively. Rotation directions in the pair of rollers 61 may be the same or different from each other to wind the fastening member 50.

The pair of rollers 61 may simultaneously wind or unwind the fastening member 50. Accordingly, the object D may be quickly gripped or released.

However, the embodiments are not limited thereto, and one end of the fastening member 50 may be fixed to the housing 30 and only the other end may be connected to the roller 61. In this case, only a single through-hole 35 may be formed in the housing 30.

The motor 62, as shown in FIG. 5, may be directly connected to the roller 61. However, the embodiments are not limited thereto, and the connection may be configured such that a rotational force of the motor 62 is transmitted to the roller 61 by a power transmission member such as a gear.

A pair of motor 62 may be provided to rotate the pair of rollers 61, respectively.

The motor 62 may be provided with a torque sensor 63 configured to sense a torque load of the motor 62.

When a sensed value of the torque sensor 63 reaches a predetermined set torque, the motor 62 may be stopped. The set torque may denote a torque load applied to the motor 62 when the elastic membrane 40 stably grips the object D.

More specifically, when the fastening member 50 fastens the elastic membrane 40, the elastic membrane 40 may come into contact with the object D and press the object D. The torque load applied on the motor 62 may become greater. Thus, the sensed value of the torque sensor 63 may be gradually increased. When the sensed value becomes greater sufficiently, it may be determined that the elastic membrane 40 stably grips the object D. Accordingly, the torque sensor 63 may easily and reliably determine whether the object D is gripped.

Meanwhile, the motor 62 and the torque sensor 63 may be electrically connected to and communicate with the controller C (see FIGS. 4*a* and 4B) described above.

Accordingly, the controller C may control the gripper 20 to grip or release the object D by controlling the motor 62. In addition, the controller C may stop the motor 62 when the sensed value of the torque sensor 63 reaches the predetermined set torque.

Hereinafter, operations of the gripper 20 and the robot according to the embodiments will be described.

As shown in FIG. 4*b*, the controller C may control the manipulator M such that the housing 30 descends in a state where the accommodation space 31 of the housing 30 is positioned above the object D.

Accordingly, as shown in FIGS. 6*a* and 7*a*, the object D may be accommodated in the accommodation space 31. The controller C may control the winder 60 such that the fastening member 50 is wound in a state where the object D is accommodated in the accommodation space 31.

Accordingly, as shown in FIGS. 6*b* and 7*b*, the fastening member 50 may fasten the elastic membrane 40. Accordingly, the elastic membrane 40 may come into contact with the object D and press the object D. The elastic membrane 40 may be stretched according to a shape of the object D, and smoothly surround a surface of the object D. The fastening member 50 may fasten the elastic membrane 40 until the elastic membrane 40 stably grips the object D.

The controller C may stop the motor 62 when the sensed value of the torque sensor 63 reaches the predetermined set torque. Thus, the fastening member 50 may maintain a state of fastening the elastic membrane 40 without being further wound on the roller 61. The elastic membrane 40 may also maintain the state of gripping the object D. Thus, the gripper 20 may complete gripping the object D.

Then, the controller C may control the manipulator M to move the gripper 20 gripping the object D to a target position. When the gripper 20 reaches the target position, the controller C may control the winder 60 to loosen the fastening member 50.

Accordingly, the fastening member 50 may stop fastening the elastic membrane 40, and the elastic membrane 40 may be unfastened by a restoring force. Accordingly, the elastic membrane 40 may be spaced apart from the object D, so that the object D may be released.

Figure 8A:
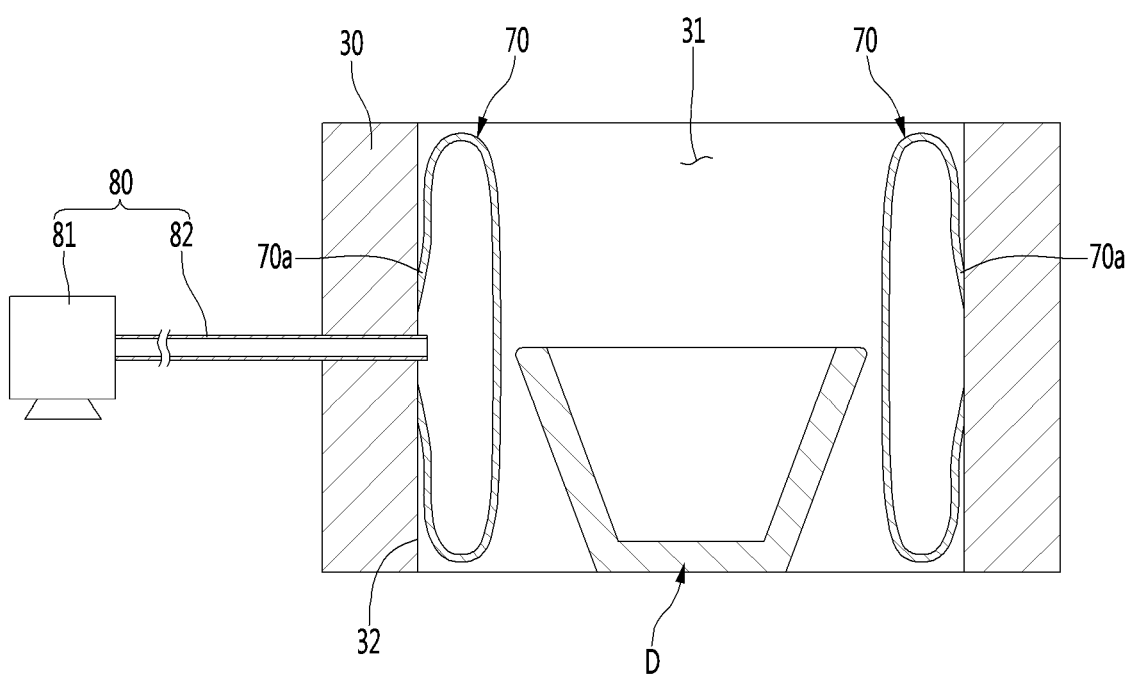
FIGS. 8a and 8b are sectional views showing a gripper according to another embodiment.
Figure 8B:
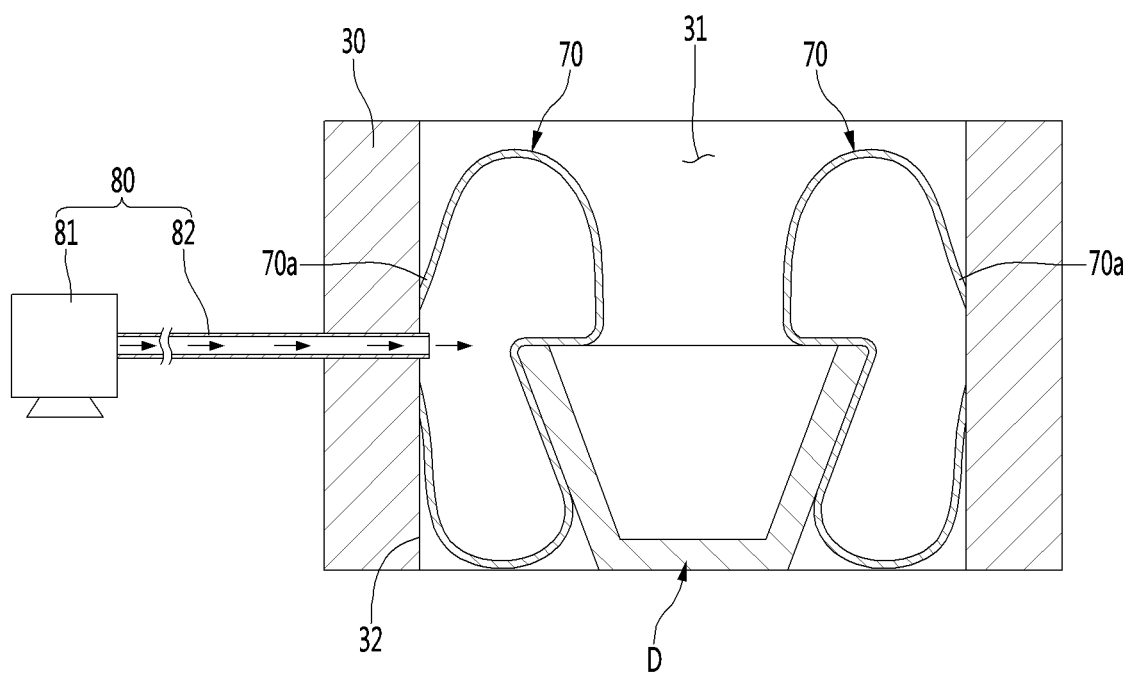

FIGS. 8*a* and 8*b* are sectional views showing a gripper according to another embodiment.

The gripper 20' according to the embodiments may include a housing 30, an air bag 70, and a pneumatic unit 80.

Descriptions of the housing 30 and the accommodation space 31 follow the above descriptions.

The airbag 70 may be provided in the accommodation space 31, and surround the object D. The airbag 70 may be provided at the inner circumference 32 of the housing 30. The airbag 70 may cover the inner circumference 32 of the housing 30.

The airbag 70 may be inflated by the pneumatic unit 80 described later so as to wrap the object D, thereby gripping the object D. On the contrary, the airbag 70 may be shrunk by the pneumatic unit 80 and thus the object D may be released.

The airbag 70 may include a fixing part 70a fixed to the housing 30.

The pneumatic unit 80 may adjust internal pressure of the airbag 70. The pneumatic unit 80 may inflate the airbag 70 by injecting air into the airbag 70, or deflate the air bag 70 by discharging the air from the airbag 70.

More specifically, the pneumatic unit 80 may include an air pump 81 and an air channel 82 configured to connect the air pump 81 to the air bag 70.

The air pump 81 may pump air in both directions. The air pump 81 may be positioned outside the housing 30.

The air channel 82 may communicate with an inside of the airbag 70. The air channel 82 may be connected to the airbag through a through-hole formed through from the outer circumference to the inner circumference of the housing 30. Alternatively, the air channel 82 may be connected to the airbag 70 through an open top or bottom surface of the accommodation space 31.

The air injected from the air pump 81 may be guided to the airbag 70 through the air channel 82. Alternatively, the air exhausted from the airbag 70 may be guided to the air pump 81 through the air channel 82. In other words, the air channel 82 may be a bi-directional channel through which the air flows bi-directionally.

The air pump 81 may be electrically connected to and communicate with the controller C (see FIGS. 4a and 4b) described above. Accordingly, the controller C may control the air pump 81 to allow the gripper 20' to grip or release the object D.

Hereinafter, operations of the gripper 20' and the robot according to the embodiments will be described.

As shown in FIG. 4b, the controller C may control the manipulator M such that the housing 30 descends in a state where the accommodation space 31 of the housing 30 is positioned above the object D. Thus, as shown in FIG. 8a, the object D may be accommodated in the accommodation space 31. The controller may control the pneumatic unit 80 to inject air into the airbag 70 in a state where the object D is accommodated in the accommodation space 31.

Accordingly, as shown in FIG. 8b, the airbag 70 may be inflated. Accordingly, the airbag 70 may come into contact with the object D and press the object D. The pneumatic unit 80 may inject the air into the airbag 70 until the airbag 70 stably grips the object D.

When the controller C stops the operation of the air pump 81, the airbag 70 may maintain a state of gripping the object D.

Then, the controller C may control the manipulator M to move the gripper 20 gripping the object D to a target position. When the gripper 20 reaches the target position, the controller C may control the pneumatic unit 80 to discharge the air from the airbag 70.

Accordingly, the airbag 70 may be deflated. Accordingly, the airbag 70 may be spaced apart from the object (D), so that the object D may be released.

According to the embodiments objects having various sizes and shapes can be gripped quickly and accurately without damage.

In addition, the torque sensor can easily and reliably determine whether the object is gripped.

In addition, a distance between the pair of through-holes may be shorter than a diameter of the accommodation space, so that the fastening member passing through the through-hole can sufficiently surround an outer circumference of the elastic membrane.

In addition, a plurality of protrusions may be formed on the inner surface of the elastic membrane, so that the elastic membrane can grip the object more stably.

The above descriptions are merely illustrative of the technical idea of the present disclosure, and it will be apparent that a person having ordinary skill in the art may carry out various deformations and modifications within the scope without departing from inherent features of the present disclosure.

Accordingly, the embodiments disclosed in the present disclosure are intended to not limit but illustrate the technical idea of the present disclosure, so the scope of the technical idea of the present disclosure is not limited by those embodiments.

The scope of the present disclosure should be understood according to the following claims, and all technical ideas within the scope of equivalents should be construed as falling within the scope of the present disclosure.

What is claimed is:
1. A grip apparatus comprising:
 a housing opened downward and formed therein with an accommodation space to accommodate an object;
 an elastic membrane provided in the accommodation space to surround the object;
 a fastening member at least partially positioned between an inner periphery of the housing and the elastic membrane to fasten the elastic membrane; and
 a winder configured to pull the fastening member by winding the fastening member,
 wherein the fastening member includes a belt or a wire.
2. The grip apparatus according to claim 1, wherein the housing is formed therein with a through-hole through which the fastening member passes, in which the through-hole is connected to a space between the inner periphery of the housing and the elastic membrane.
3. The grip apparatus according to claim 2, wherein the through-hole includes a pair of through-holes spaced apart from each other in a horizontal direction, and a distance between the pair of through-holes is shorter than a diameter of the accommodation space.
4. A grip apparatus comprising;
 a housing opened downward and formed therein with an accommodation space to accommodate an obi eel;
 an elastic membrane provided in the accommodation space to surround the object;
 a fastening member at least partially positioned between an inner periphery of the housing and the elastic membrane to fasten the elastic membrane; and
 a winder configured to pull the fastening member by winding the fastening member,
 wherein the winder includes:
  a roller rotated about a vertical axis and wound by the fastening member; and
  a motor configured to rotate the roller.
5. The grip apparatus of claim 4, further comprising a torque sensor configured to sense a torque load of the motor, wherein the motor is stopped when a sensed value of the torque sensor reaches a predetermined set torque.
6. A grip apparatus comprising:
 a housing opened downward and formed therein with an accommodation space to accommodate an object;
 an elastic membrane provided in the accommodation space to surround the object;

a fastening member at least partially positioned between an inner periphery of the housing and the elastic membrane to fasten the elastic membrane; and a winder configured to pull the fastening member by winding the fastenin member, wherein the elastic membrane includes:
an upper fixing portion fixed to the housing;
a lower fixing portion fixed to the housing and spaced downward from the upper fixing portion; and
an elastic portion positioned between the upper fixing portion and the lower fixing portion, and wherein the fastening member faces the elastic portion with respect to a horizontal direction.

7. A grip apparatus comprising:

a housing opened downward and formed therein with an accommodation space to accommodate an object;

an elastic membrane provided in the accommodation space to surround the object;

a fastening member at least partially positioned between an inner periphery of the housing and the elastic membrane to fasten the elastic membrane; and a winder configured to pull the fastening member by winding the fastening member, wherein a plurality of protrusions are formed on an inner surface of the elastic membrane.

8. A robot comprising:

a manipulator;

a housing provided in the manipulator and formed therein with an accommodation space opened downward to accommodate an object;

an elastic membrane provided in the accommodation space to surround the object;

a fastening member at least partially positioned between an inner periphery of the housing and the elastic membrane to fasten the elastic membrane; and a winder configured to pull the fastening member by winding the fastening member, wherein the robot further comprises a controller configured to:
control the manipulator so that the housing descends while the accommodation space is positioned above the object, and
control the winder so that the fastening member is wound while the object is accommodated in the accommodation space.

9. The robot according to claim 8, wherein the fastening member includes a belt or a wire.

10. The robot according to claim 8, wherein the winder includes:

a roller rotated about a vertical axis and wound b the fastening member; and a motor configured to rotate the roller.

11. The robot according to claim 10, further comprising a torque sensor configured to sense a torque load of the motor, wherein the controller stops the motor when a sensed value of the torque sensor reaches a predetermined set torque.

12. The robot according to claim 8, wherein the elastic membrane includes:
an upper fixing portion fixed to the housing;
a lower fixing portion fixed to the housing and spaced downward from the upper fixing portion; and
an elastic portion positioned between the upper fixing portion and the lower fixing portion, and
wherein the fastening member faces the elastic portion with respect to a horizontal direction.

13. The robot according to claim 8, wherein the housing is formed therein with a through-hole through which the fastening member passes, in which the through-hole is connected to a space between the inner periphery of the housing and the elastic membrane.

14. The robot according to claim 13, wherein the through-hole includes a pair of through-holes spaced apart from each other in a horizontal direction, and a distance between the pair of through-holes is shorter than a diameter of the accommodation space.

15. The robot according to claim 8, wherein a plurality of protrusions are formed on an inner surface of the elastic membrane.

16. A robot comprising:

a manipulator;

a housing provided in the manipulator and formed therein with an accommodation space opened downward to accommodate an object;

an airbag provided at an inner periphery of the housing to surround the object; and a pneumatic unit configured to inject air into the airbag, wherein the robot further comprises a controller configured to:
control the manipulator so that the housing descends while the accommodation space is positioned above the object, and
control the pneumatic unit so that the airbag inflates while the object is accommodated in the accommodation space.

17. The robot according to claim 16, wherein the pneumatic unit includes:
an air pump; and
an air channel configured to connect the air pump to the airbag.

* * * * *